Patented Aug. 3, 1954

2,685,580

UNITED STATES PATENT OFFICE 2,685,580

1-ISONICOTINYL-2-ALDOSYLHYDRAZINE

Herman Herbert Fox, Passaic, N. J., assignor to Hoffmann-La Roche Inc., Nutley, N. J., a corporation of New Jersey No Drawing. Application January 18, 1951, Serial No. 206,732

8 Claims. (Cl. 260—211)

This invention relates to 1-isonicotinyl-2-aldosylhydrazines, and, more particularly, to 1-isonicotinyl-2-aldopentosylhydrazines and 1-isonicotinyl-2-aldohexosylhydrazines, e. g., 1-isonicotinyl-2-xylosylhydrazine, 1-isonicotinyl-2-ribosylhydrazine, 1-isonicotinyl-2-glucosylhydrazine, 1-isonicotinyl-2-galactosylhydrazine, and the like. The new compounds are useful as antituberculosis agents.

The new compounds can be represented by the following formula:

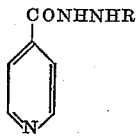

where "R" is an aldose radical, e. g., aldopentosyl and aldohexosyl.

In general, the 1-isonicotinyl-2-aldosylhydrazines can be prepared by condensing isonicotinic acid hydrazide with an aldose, e. g., an aldopentose or an aldohexose. The reagents are preferably employed in equimolecular amounts, and the reaction is preferably carried out in a suitable diluent, e. g., methanol. In a preferred mode of practicing the process, the mixture of the reagents in the diluent is refluxed together until the reaction is complete.

The following examples will serve to illustrate the invention:

Example 1

A mixture of 137 grams (1 mol) of isonicotinic acid hydrazide and 180 grams (1 mol) of anhydrous d-glucose in 1,000 cc. of methanol was refluxed until solution was complete. The reaction mixture was filtered, and then cooled. A white crystalline precipitate of 1-isonicotinyl-2-d-glucosylhydrazine was obtained. The compound darkens on heating and then decomposes at 160° C.

Example 2

A mixture of 13.7 grams (0.1 mol) of isonicotinic acid hydrazide and 18 grams (0.1 mol) of anhydrous d-galactose in 100 cc. of methanol was refluxed until solution was complete. The reaction mixture was concentrated on a steam bath to one-third volume and then hot isopropanol was slowly added thereto, whereupon a crystalline precipitate was obtained. Addition of isopropanol was continued until precipitation was complete. The mixture was then cooled and filtered. 1-isonicotinyl-2-d-galactosylhydrazine was obtained in the form of colorless crystals, which melted with decomposition at 154.5–156° C.

Example 3

A mixture of 13.7 grams (0.1 mol) of isonicotinic acid hydrazide and 15 grams (0.1 mol) of d-xylose in 100 cc. of methanol was refluxed until solution was complete. The methanol was then removed under vacuum and the viscous residue was solidified by further drying in a vacuum desiccator. 1-isonicotinyl-2-d-xylosylhydrazine was obtained as a glassy material. It usually contained one-half molecule of methanol of crystallization.

Example 4

A mixture of 13.7 grams (0.1 mol) of isonicotinic acid hydrazide and 15 grams (0.1 mol) of d-ribose and 100 cc. of methanol was refluxed until solution was complete. The methanol was then removed under vacuum and the viscous residue was solidified by further drying in a vacuum desiccator. 1-isonicotinyl-2-d-ribosylhydrazine was obtained as a glassy material. The product usually contained 1 molecule of methanol of crystallization.

I claim:

1. 1-isonicotinyl-2-aldosylhydrazine.
2. A compound selected from the group consisting of 1-isonicotinyl-2-aldopentosylhydrazine and 1-isonicotinyl-2-aldohexosylhydrazine.
3. 1-isonicotinyl-2-aldopentosylhydrazine.
4. 1-isonicotinyl-2-aldohexosylhydrazine.
5. 1-isonicotinyl-2-d-xylosylhydrazine.
6. 1-isonicotinyl-2-d-ribosylhydrazine.
7. 1-isonicotinyl-2-d-glucosylhydrazine.
8. 1-isonicotinyl-2-d-galactosylhydrazine.

References Cited in the file of this patent

UNITED STATES PATENTS

| Number | Name | Date |
|---|---|---|
| 2,233,475 | Drefus | Mar. 4, 1941 |
| 2,355,911 | Graenacher | Aug. 15, 1944 |

OTHER REFERENCES

Selikoff et al.: Quarterly Bulletin of Sea View Hospital, vol. XIII, No. 1, pages 17, 18, January 1952.